United States Patent
Tschauder

[11] Patent Number: 5,296,681
[45] Date of Patent: Mar. 22, 1994

[54] APPARATUS FOR HOT MOISTENING FACE-TOWELS

[76] Inventor: Gunter Tschauder, An der Lehmkaut 10, 6393 Wehrheim, Fed. Rep. of Germany

[21] Appl. No.: 944,910

[22] Filed: Sep. 15, 1992

Related U.S. Application Data

[63] Continuation-in-part of Ser. No. 820,260, Jan. 14, 1992, abandoned.

[30] Foreign Application Priority Data

Jan. 15, 1991 [DE] Fed. Rep. of Germany ....... 4100961
Jul. 23, 1992 [EP] European Pat. Off. ......... 92112622.3

[51] Int. Cl.⁵ ................................................ A21B 1/00
[52] U.S. Cl. ..................................... 219/410; 219/401; 126/369; 392/397
[58] Field of Search ............... 219/385, 386, 401, 410; 392/394, 396, 397, 480, 471, 467; 126/20.1, 20.2, 369

[56] References Cited

U.S. PATENT DOCUMENTS

| | | | |
|---|---|---|---|
| 520,470 | 5/1894 | Yinger | 126/369 |
| 619,455 | 2/1899 | Williams | 126/369 |
| 931,088 | 8/1909 | Roberts | 219/401 |
| 2,818,794 | 1/1958 | Aslesen | 219/401 |
| 3,096,817 | 7/1963 | McKenna | 392/402 |
| 3,147,689 | 9/1964 | Sakamoto et al. | 126/382 |
| 3,171,473 | 3/1965 | Lawler | 219/401 |
| 3,902,044 | 8/1975 | Doyle et al. | 219/401 |
| 3,947,134 | 3/1976 | Ogawa | 401/118 |
| 3,973,480 | 8/1976 | Anderson | 126/369 |
| 4,084,080 | 4/1978 | McMahan | 219/401 |
| 4,117,309 | 9/1978 | Cayley | 219/385 |
| 4,153,187 | 5/1979 | Marrington | 222/440 |
| 4,325,293 | 4/1982 | Bleckmann | 392/480 |
| 4,509,412 | 4/1985 | Whittenburg et al. | 219/401 |
| 4,947,026 | 8/1990 | Groom et al. | 219/401 |
| 4,974,431 | 12/1990 | Kyle | 68/5 C |

FOREIGN PATENT DOCUMENTS 2163385 6/1973 Fed. Rep. of Germany .
3637375 5/1988 Fed. Rep. of Germany .

Primary Examiner—Bruce A. Reynolds
Assistant Examiner—Gregory Mills
Attorney, Agent, or Firm—Armstrong, Westerman, Hattori, McLeland & Naughton

[57] ABSTRACT

An apparatus is disclosed for hot-moistening face-towels having a heating system with a heater unit and a water pipe. A metering container is provided for metering a predetermined quantity of water to be heated in the heating system, the metering container being in fluid communication with one end of the water pipe. A chamber having a base plate is also provided where the heater unit is fixed from below to the base plate. Towel supports are disposed within the chamber, and a spray system is mounted on a ceiling of the internal chamber for spraying steam and hot water of said predetermined quantity onto towels supported on the towel supports within the internal chamber. The spray system is in fluid communication with a second end of the water pipe.

4 Claims, 4 Drawing Sheets

APPARATUS FOR HOT MOISTENING FACE-TOWELS

BACKGROUND OF THE INVENTION

This application is a Continuation-In-Part of application Ser. No. 07/820,260, filed Jan. 14, 1992, now abandoned, the subject matter of which is incorporated herein by reference.

FIELD OF THE INVENTION

This invention relates to an apparatus for hot-moistening face-towels. More particularly, this invention relates to an apparatus for hot-moistening face-towels with a predetermined amount of heated water to moisten the towels and with steam to keep the towels hot as long as necessary, the water being heated in a heated unit below a base plate of a chamber for hot-moistening and being supplied to the face-towels by a spray system mounted on the ceiling, the steam being supplied by the spray system and above all by evaporated water on the base plate issued of water not absorbed by the towels.

DESCRIPTION OF THE RELATED ART

Face towels are generally moistened by water and then heated. Ether oils can be added to the water such as for adding a fragrance to the towels. Such face towels are widely dispensed by airlines and restaurants for passengers and guests to refresh themselves. Conventionally, the towels are moistened, rolled and then either wound in aluminum foil and placed in a hot-air oven, or are rolled in plastic foil and heated in a hot air or microwave oven. After heating, the towels are unwound from the foil and given to the customer or guest. Winding and unwinding of the towels in the foil is a cumbersome, tedious and time-consuming procedure and, in particular, precludes the use of face towels whenever or wherever hot air ovens, or the like, are not available.

U.S. Pat. No. 3,902,044 discloses an electrically heated towel steaming apparatus. An electrically heated steam generator is located in the base below a perforated tray. A plurality of fasteners are provided on the inside of the top cover for suspending towels to be heated. In addition, the top of the cover is provided with an aperture for relieving steam pressure during steaming of the towels. The user of the device uses a measuring cup to provide the proper amount of water to the base of the apparatus.

U.S. Pat. No. 4,084,080 discloses an apparatus for heating and moistening towels having a water tray holding a quantity of water and supporting a removable perforated table which supports the towels. Water is introduced into the water tray by manually pouring thereinto. In addition, a temperature control controls the amount of heating to maintain a relatively constant temperature within the heating chamber.

U.S. Pat. No. 4,947,026 discloses an apparatus which moistens towels by heating water in a pan underneath the towels to generate steam and by dripping hot water from above onto the towels via a pump. The complex design of this apparatus is impractical due to, on the one hand, the possible soiling of the water in the open pan, as well as the possibility of water spilling out of the apparatus if the apparatus is impacted. Due to the complex pumping system lacking an adequate timing control, uniform and adequate moistening of the towels is not insured. In addition, all of the water in the container, required to at least cover the heater coil, must be made to boil to produce steam.

SUMMARY OF THE INVENTION

An object of the present invention is to provide an apparatus that overcomes the above-noted deficiencies.

Another object of the present invention is to provide an apparatus which allows for accurately controlling the amount of moistening of face-towels within the moistening chamber.

Another object of the present invention is to provide an apparatus for moistening face towels which is easily and reliably operated and which does not under or over moisten the towels.

Still another object of the present invention is to provide an apparatus for moistening face towels having a metering device for metering a quantity of water to be heated for spraying from above onto the towels to be moistened.

Still another object of the present invention is to provide an apparatus for hot-moistening face towels having a recycling device for the heated water not being absorbed by the towels and driping onto the base-plate to be evaporated and keep the towels hot as long as necessary.

These and other objects of the present invention are achieved by an apparatus for moistening face towels having a heating system communicating with a metering device fixed below a base plate of an internal chamber of the apparatus, angled towel supports within the moistening chamber, and a spray system in full communication with the heating system and mounted on the ceiling of the chamber and comprising supply conduits and pipes above the towel supports for spraying steam/hot water onto the towels below, without using a water pump.

The towels to be moistened are laid inside the internal chamber of the apparatus on supports in the form of steep gables. A water-heater is mounted underneath the base-plate of the internal chamber of the apparatus, and is for on the one hand heating the base plate, and on the other hand feeding the heated water to a pipe system disposed on the ceiling of the internal chamber. The pipe system sprays the heated water from above onto the towels supported by the gabled supports. Water not absorbed by the towels drips onto the base-plate below the gabled towel supports where it is heated and again evaporated.

In addition, the water to be heated is metered from a metering container which can be replenished from a larger reservoir. The metering container is designed to hold a predetermined amount of water which is a proper amount for adequately moistening and heating the towels within the moistening chamber.

BRIEF DESCRIPTION OF THE PREFERRED EMBODIMENTS

This invention may be better understood and its numerous objects and advantages will become apparent to those skilled in the art by reference to the accompanying drawings wherein.

DETAILED DESCRIPTION OF THE PREFERRED EMBODIMENTS

Figure 1:
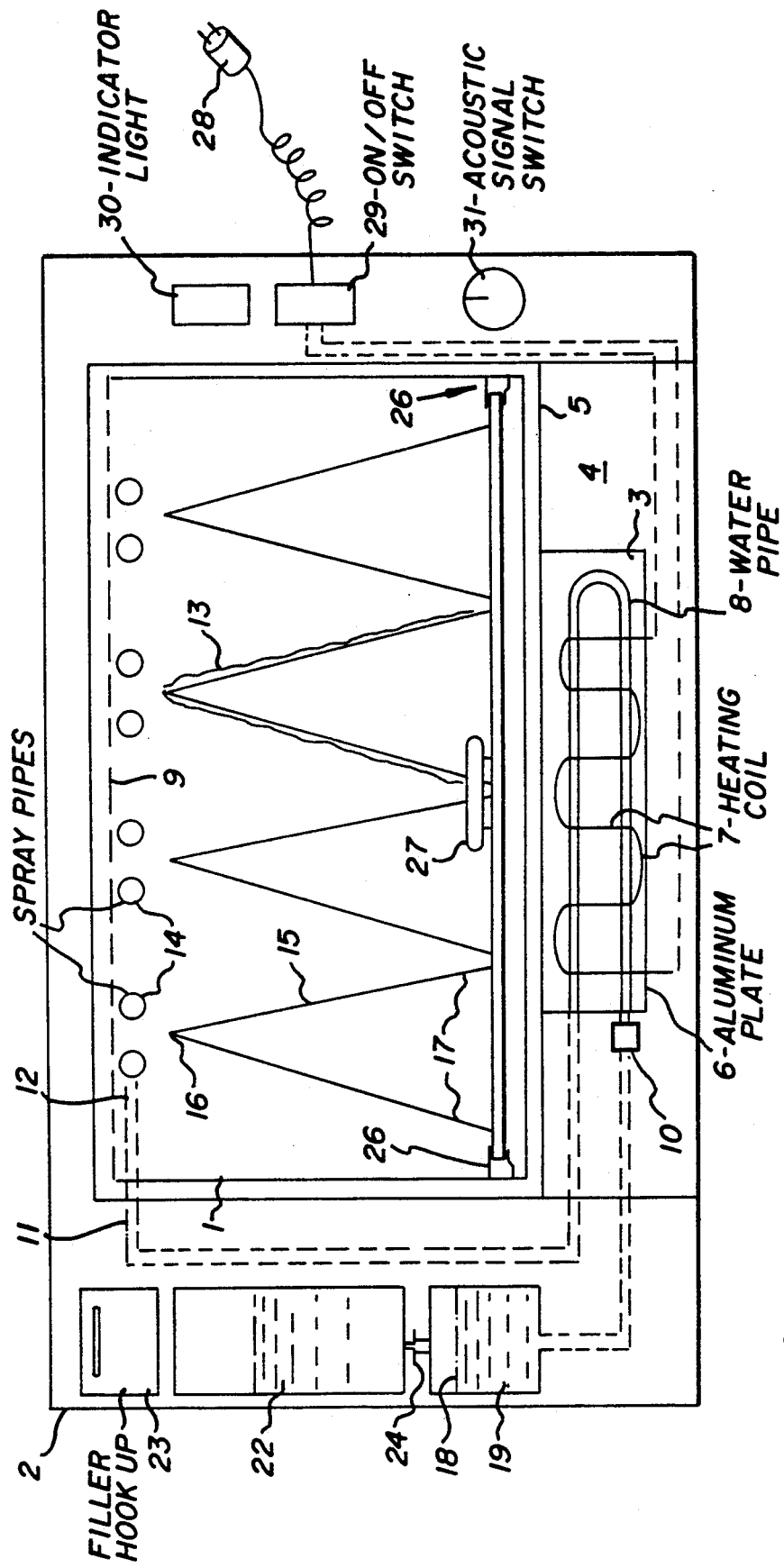
FIG. 1 is a front view of the towel moistening apparatus of the present invention.

As shown in FIG. 1, the towel moistening apparatus of the present invention comprises an external housing 2 and an internal chamber 1 accessible through a front door (not shown). The heating system of the present invention is disposed underneath a base-plate 5, preferably made of metal, of the internal chamber 1. The base-plate 5 is positioned within closed space 4. The heating system of the present invention preferably comprises an aluminum plate 6 integral with a heater unit 7 and a stainless-steel water pipe 8. The heating system 3 is planar at the surface and is affixed directly underneath and against the base plate 5 of the internal frame 1. The heating system 3 can be attached to the base plate 5 by, for example, screws. The heater unit 7, preferably having a tubular form, heats the aluminum plate 6 and thereby the metal base plate 5 of the internal frame 1. In addition, the heater unit 7 simultaneously heats the water in water pipe 8. The entire heating system 3 is controlled by a thermostat. The heated water in pipe 8 can be prevented from flowing back to the metering container by a back pressure valve 10.

Water pipe 8 is in fluid communication with a metering container 19 at one end and to a spray system 12 via a conduit 11. As the water in the pipe 8 is heated, the heated water thermally rises in the conduit 11 as high as the spray system 12 at which point it is sprayed over the towels 13 positioned therebelow.

Figure 3:
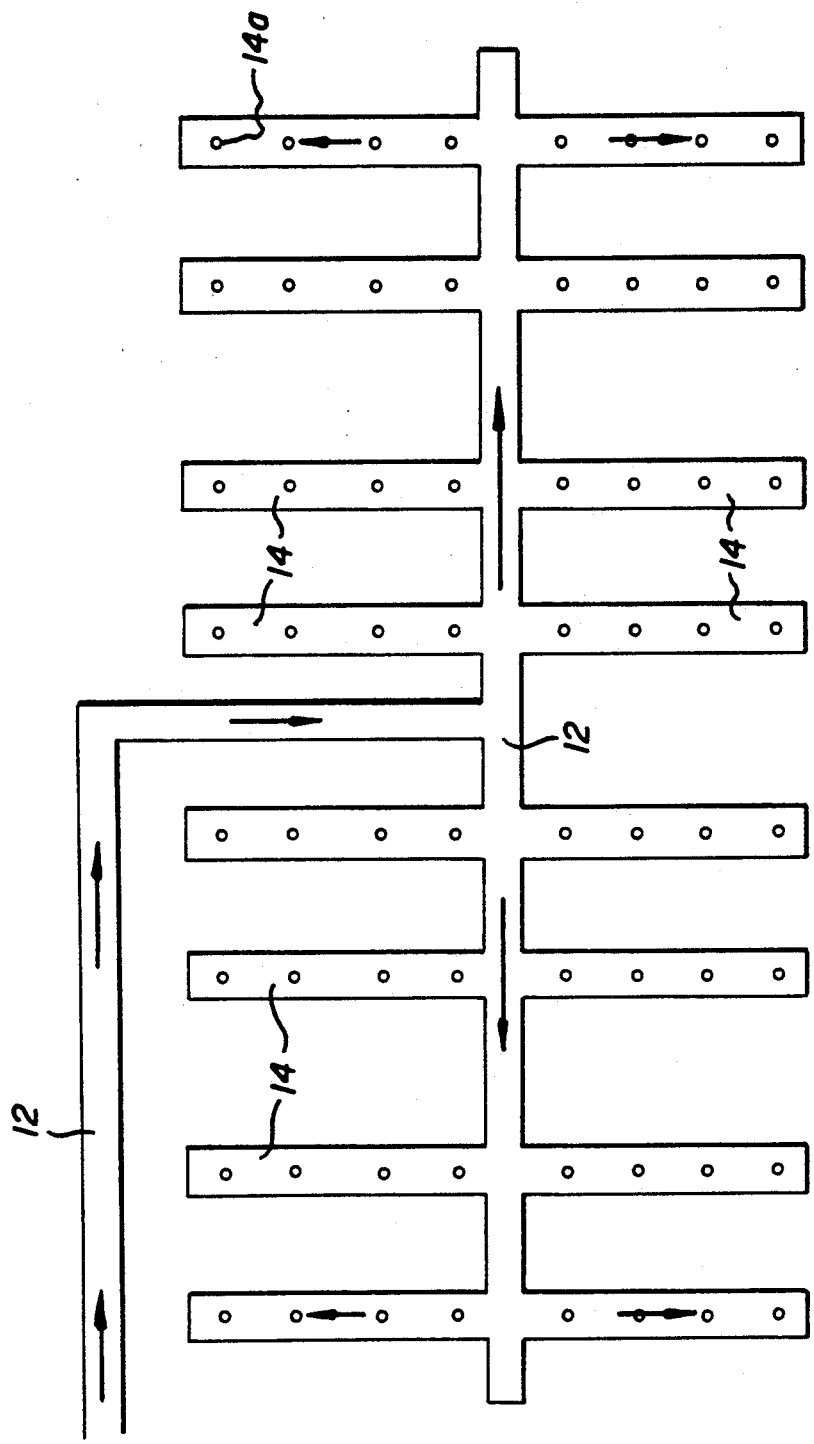
FIG. 3 is a view of the spray system for the ceiling of the towel moistening chamber.
Figure 4:
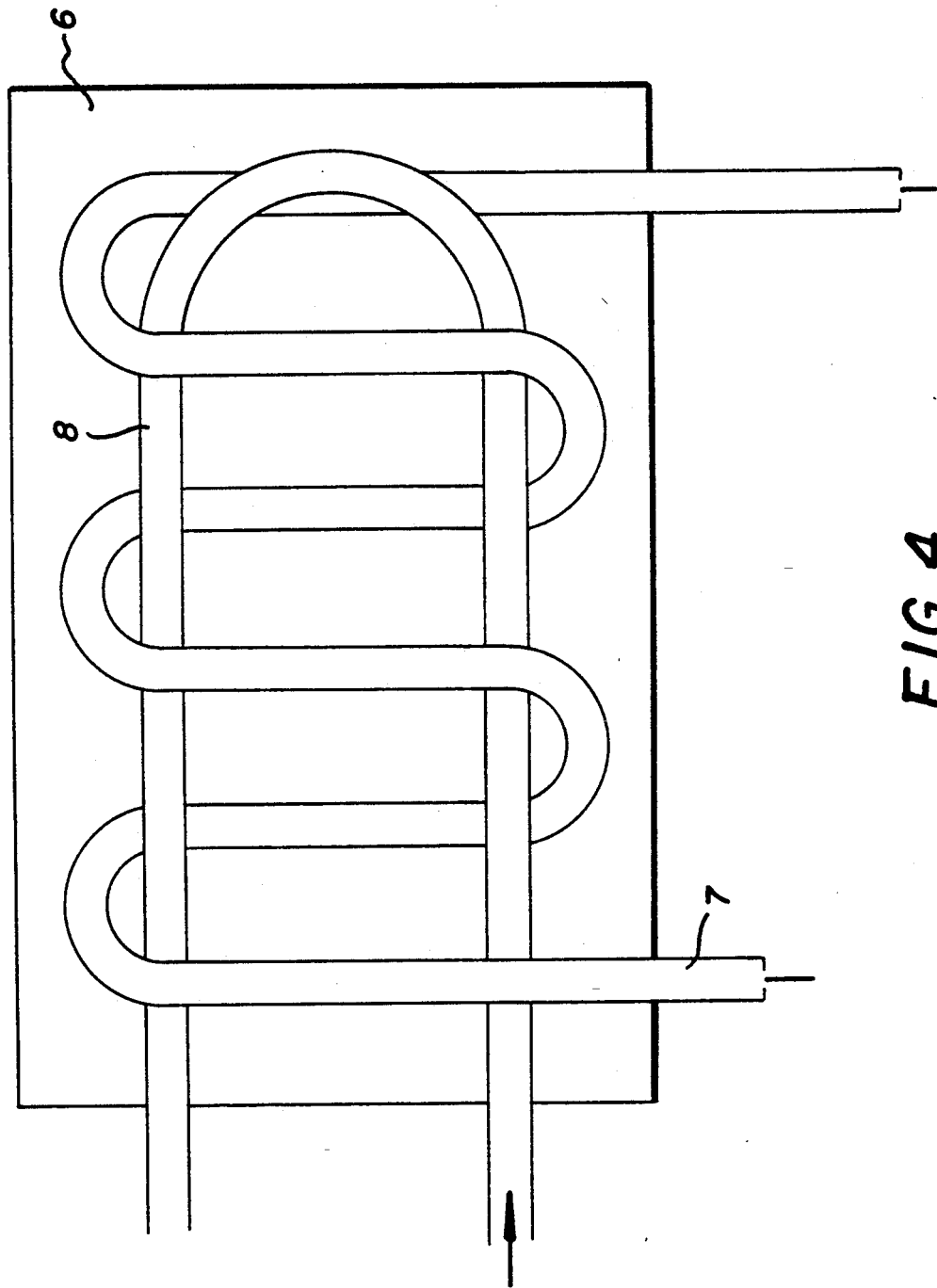
FIG. 4 is a view of the heating system for the present invention.

Spray system 12 is affixed to the ceiling 9 of internal chamber 1 and, as can be seen in FIG. 3, preferably comprises groupings of four parallel pipes 14 above each towel below. More particularly, the spray system comprises two parallel pipes directed away from each other from a central conduit on the right and left sides of a gable 16 disposed therebelow. Pipes 14 have holes 14a on their undersides to allow for the spraying of steam/hot water on the towels beneath them.

Figure 2:
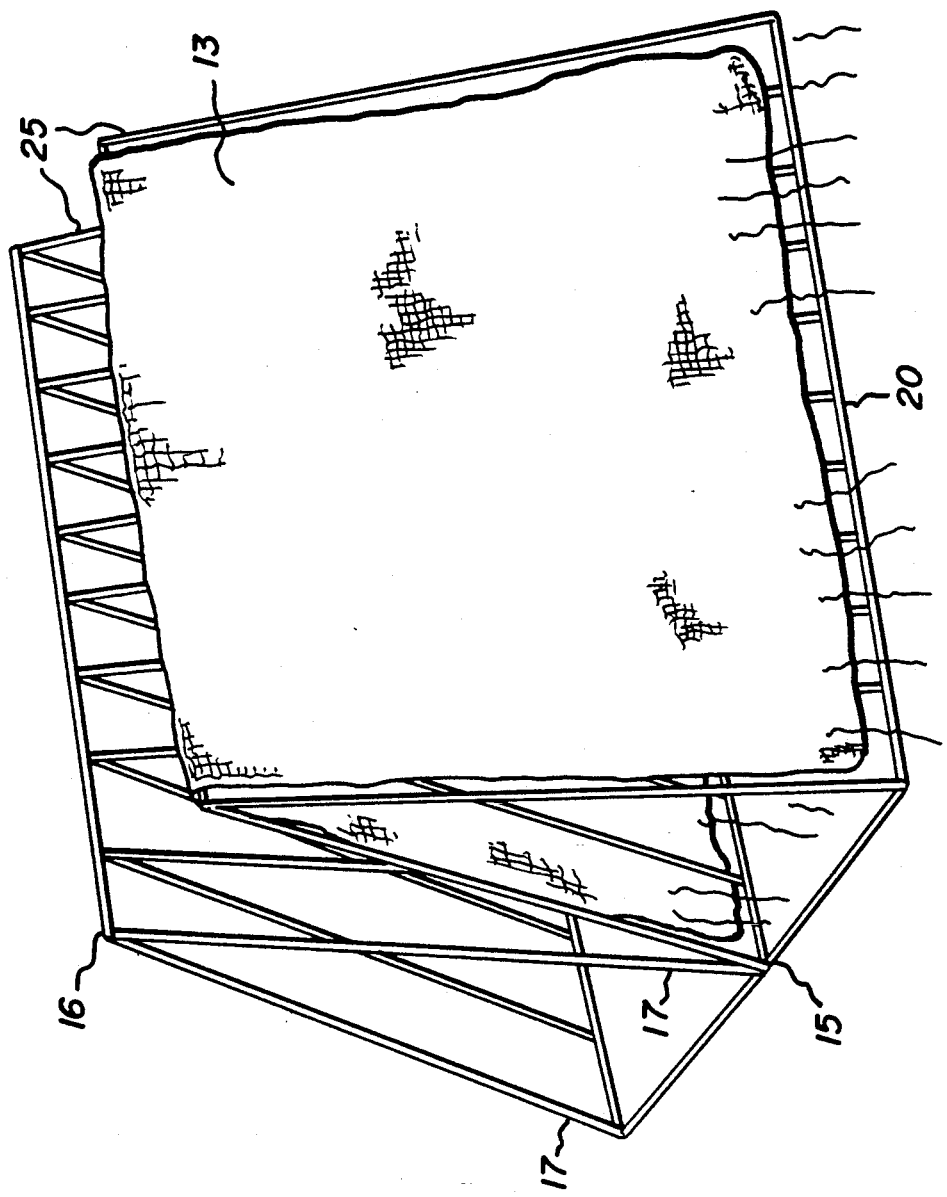
FIG. 2 is a perspective view of the towel support system.

Supports 15 for the towels 13 comprise steep gables 25 as can be seen in FIG. 2. A rack, preferably made of lightweight metal, can be pulled out from the internal frame 1 on rails 26 which support the individual gables 25 comprising thin metal bars and thus hampering only minimally the access of hot spray water and steam. The towels are preferably laid individually on each gable and thereupon can be optimally moistened from above due to the array of pipes 14 on the ceiling. The upper edge 16 of each support 15 is substantially directly below pipes 14. As can be seen in FIG. 1, pipes 14 extend parallel to the upper edge 16 and slightly to the left and right of the upper edge. By this positioning, the hot water and steam can optimally moisten the towels draped over the gables.

Once the apparatus is turned ON, water heated in the heating system 3 is forced in a purely thermal manner through pipes 14 (via pipes 11, 12), the water partly evaporating at the edges of holes 14a so as to arrive at the towels below partly as steam and partly as hot water. Once the metered quantity of water from metering container 19 has been used up, the downward spraying from holes 14a ceases automatically, at which point the towels 13 have been optimally moistened. The optimal quantity of water can be indicated by suitable mark 18 on the metering container 19, and as a result, slight changes in towel moisture can be implemented by filling more or less water into the metering container.

Excess water sprayed past towels 13 drops onto the heated base-plate 5. Because base-plate 5 is heated by the heating unit 3 below, any such excess water thereby evaporates within the internal chamber. The steam condensate in the internal chamber arrives at the base-plate and again evaporates there. Once the spraying from above terminates due to the water supply in the metering container having been exhausted, the steam circulation within the moistening chamber ensures that the moist towel shall remain hot even after the water supply has ended. The hot steam exerts no further influence on the towel moisture except for heating such that the towel will not become drenched. Once the proper moisture has been obtained by spraying the metered quantity of water, the moisture of the towels and in the chamber remains constant without requiring further control by an operator. The heating system 3 is thermostatically controlled by known means. As such, manual control is required neither for moisturization nor for heating.

As can further be seen in FIG. 1, in addition to metering container 19, the apparatus also preferably comprises a large reservoir 22 which can be filled such as via an outward-tipping filler hook up 23. Reservoir 22 receives and holds water sufficient for a number of heating cycles. A cock 24 is mounted between the reservoir 22 and the metering container 19 and is opened or closed, for example manually, when the water level in the metering container 19 has risen to a predetermined level 18. The filing of metering container 19 from reservoir 22 can be performed in an automated manner.

The apparatus of the present invention can be connected to a household power supply via a conventional plug 28. If used on a vehicle such as a train or airplane, the apparatus would be plugged into an appropriate power source thereon. Preferably the apparatus includes an ON-OFF switch 29. When the apparatus is ON, a pilot light 30 may be used as a display to indicate that the apparatus is in use. By using appropriate circuitry, the time when the towels have been optimally moistened can be indicated by an acoustical signal. However, if such an acoustical signal is not designed (e.g. if the towel moistening apparatus is in use in a conference room) a signal switch 31 may be activated to suppress the acoustic signal.

Although only a few embodiments of the present invention have been particularly described herein, it will be apparent to those skilled in the art that many useful modifications could be made within the scope of this invention. The aim in the appended claims is to cover all such changes and modification as well as others within the true spirit and scope of this invention.

What is claimed is:

1. An apparatus for hot-moistening face-towels comprising:
   a heating system comprising a heater unit and a water pipe;
   a metering container for metering a predetermined quantity of water to be heated in the heating system, the metering container in fluid communication with one end of the water pipe;
   an internal chamber comprising a base plate, wherein the heater unit is affixed from below to the base plate;
   towel supports disposed within said chamber;

a spray system mounted on a ceiling of the internal chamber for spraying steam and hot water of said predetermined quantity onto towels supported on the towel supports within the internal chamber, the spray system being in fluid communication with a second end of said water pipe;

wherein the towel supports are in the form of steep gables with triangular cross section; and wherein the spray system comprises supply conduits in fluid communication with said water pipe of the heating system and a plurality of pairs of spray pipes, each pair mounted so as to be disposed parallel to and on either side of a horizontal top portion of each respective towel support.

2. The apparatus as defined in claim 1, wherein the heater unit comprises a tubular heating coil which is integral along with the water pipe with an aluminum plate.

3. An apparatus as defined in claim 1, wherein the supports comprise metal bars affixed to a metal rack which is slidably disposed on rails for pulling the metal rack out from the internal chamber.

4. An apparatus as defined in claim 1, further comprising a reservoir disposed proximate to said metering container, and a shut off valve disposed between the reservoir and the metering container.

* * * * *